United States Patent
Kim

(10) Patent No.: US 6,708,338 B1
(45) Date of Patent: Mar. 16, 2004

(54) APPARATUS AND METHOD FOR GENERATING BROADCAST INTEROPERABLE PROTOCOL MESSAGE

(75) Inventor: Eun Sam Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/518,087

(22) Filed: Mar. 3, 2000

(30) Foreign Application Priority Data

Mar. 5, 1999 (KR) .......................................... 1999-7339

(51) Int. Cl.⁷ ................................................ H04N 7/16
(52) U.S. Cl. ...................... 725/135; 725/138; 725/139; 725/140; 725/86; 725/146
(58) Field of Search ................................ 725/138, 139, 725/135, 140, 101, 86, 146

(56) References Cited

PUBLICATIONS

Balabanian, V. Casey, L. Greene, N. Adams, C., IEEE Communications Magazine, On page(s): 122–127, vol.: 34, Issue: 11, Nov. 1996.*

Crinon, R.J., Consumer Electronics, 1997. Digest of Technical Papers. ICCE., International Conference on, On page(s): 246–247, Jun. 11–13, 1997.*

Atzori, L. De Natale, F.G.B. Gregorio, M.D. Giusto, D.D., Dept. of Electr. & Electron. Eng., Cagliari Univ.; Broadcasting, IEEE Transactions on, On page(s): 383–392, vol.: 43, Dec. 1997.*

* cited by examiner

Primary Examiner—John Miller
Assistant Examiner—Johnny Ma
(74) Attorney, Agent, or Firm—Birch, Stewart, Kolasch & Birch, LLP

(57) ABSTRACT

The present invention relates to an apparatus and method for generating a broadcast interoperable protocol (BIOP) message for effectively generating a broadcast interoperable protocol message in a data/object carousel of a data server. A BIOP message in the conventional art has a problem that the size of data transmitted from a server to a client is large and accordingly the BIOP is generated in a non-effective way. In order to solve the above problem, there is provided a method for generating a BIOP message in accordance with the present invention includes the steps of classifying the series of objects as a module, obtaining an interoperable object reference (IOR) to the objects, and forming the objects in a single broadcast interoperable protocol message. Thus, the BIOP message is easily generated for a large amount of object data, so that the large amount of data can be transmitted to a plurality of clients in real time with ease.

10 Claims, 5 Drawing Sheets

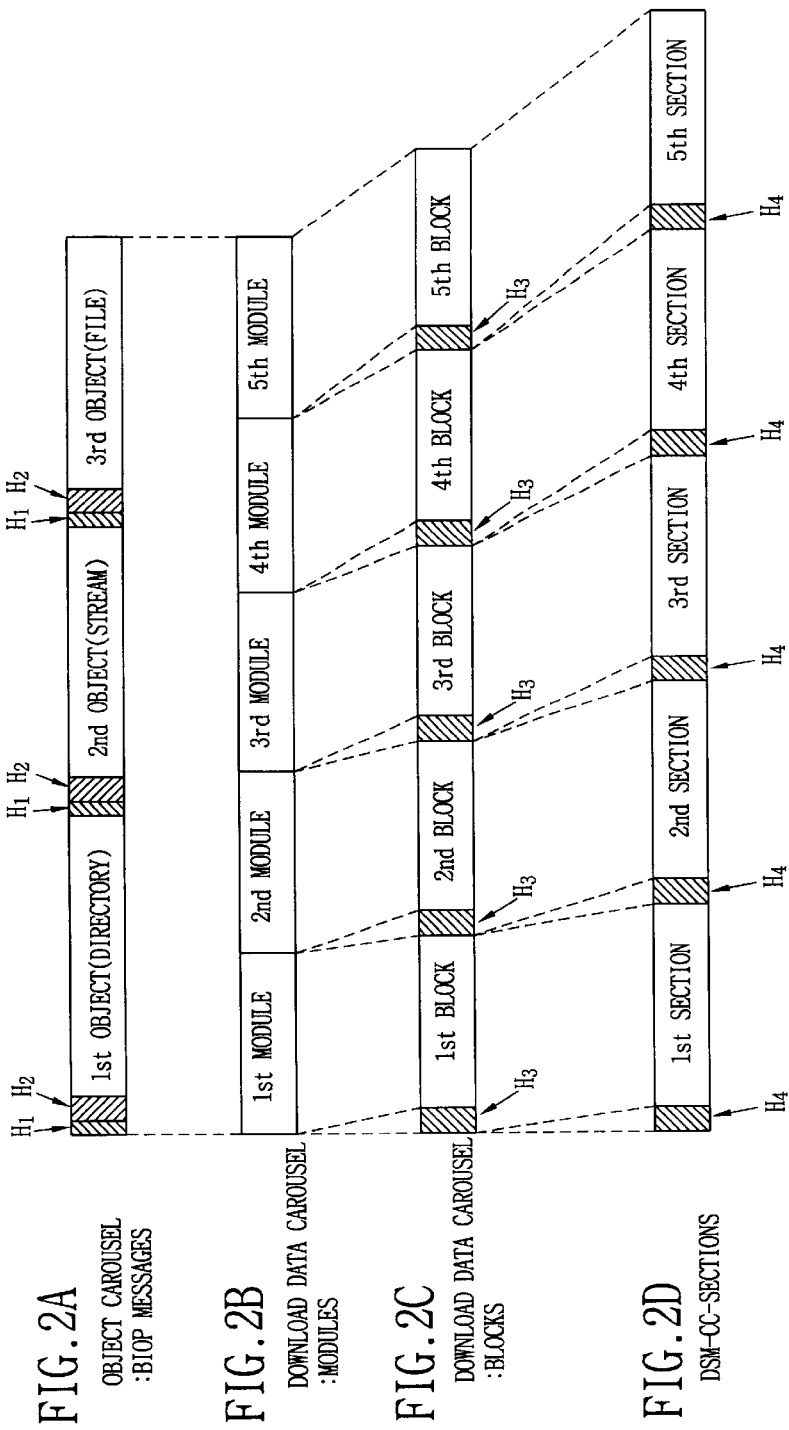

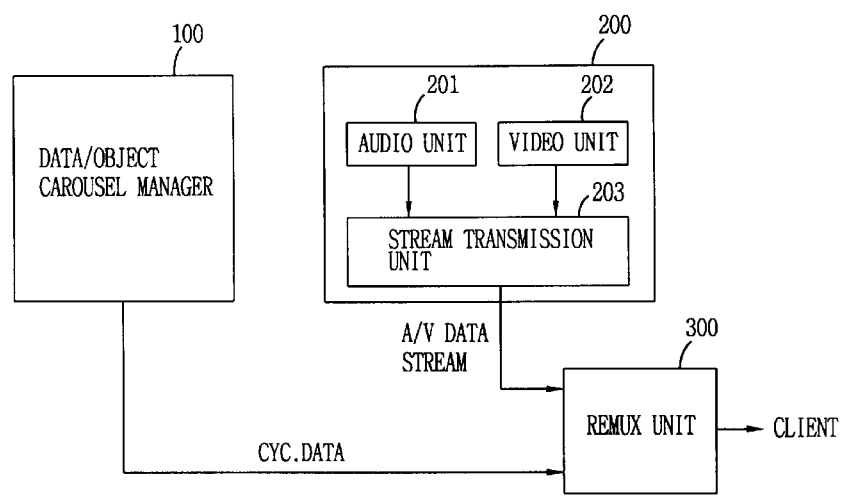
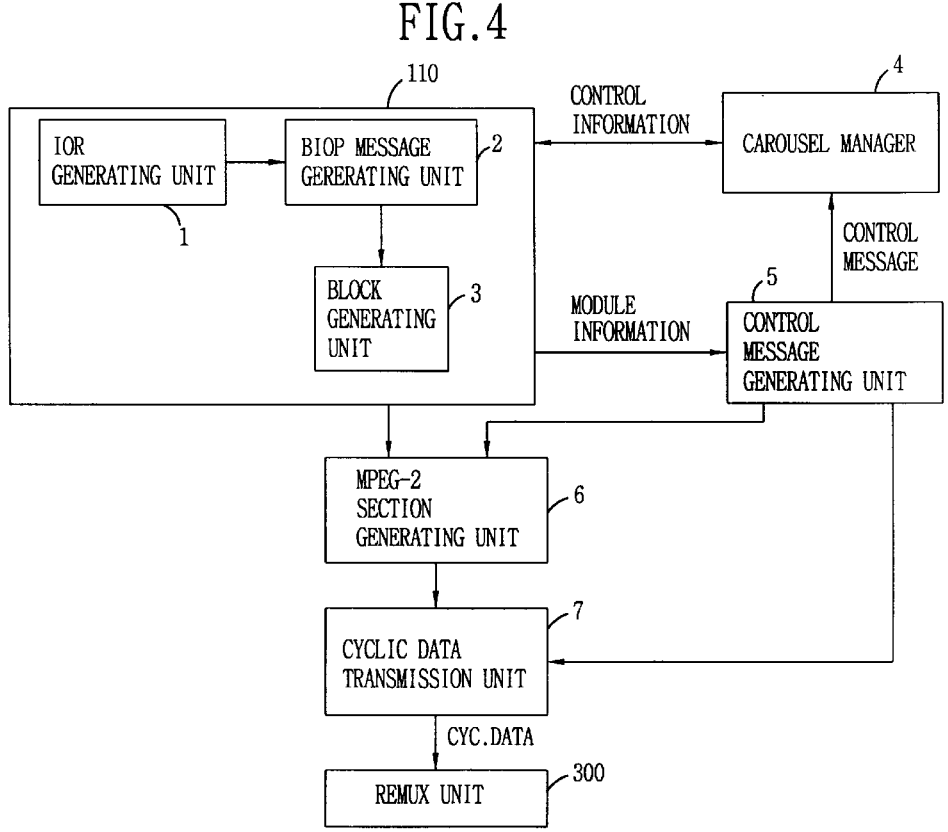

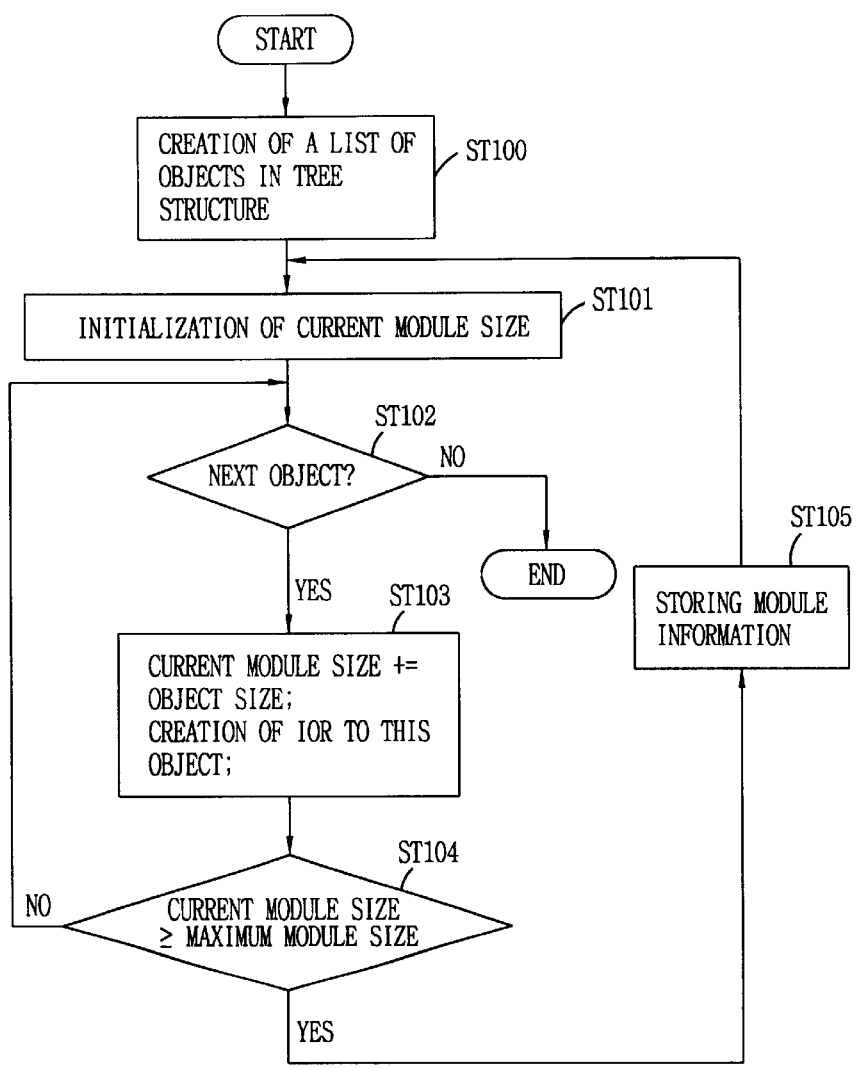

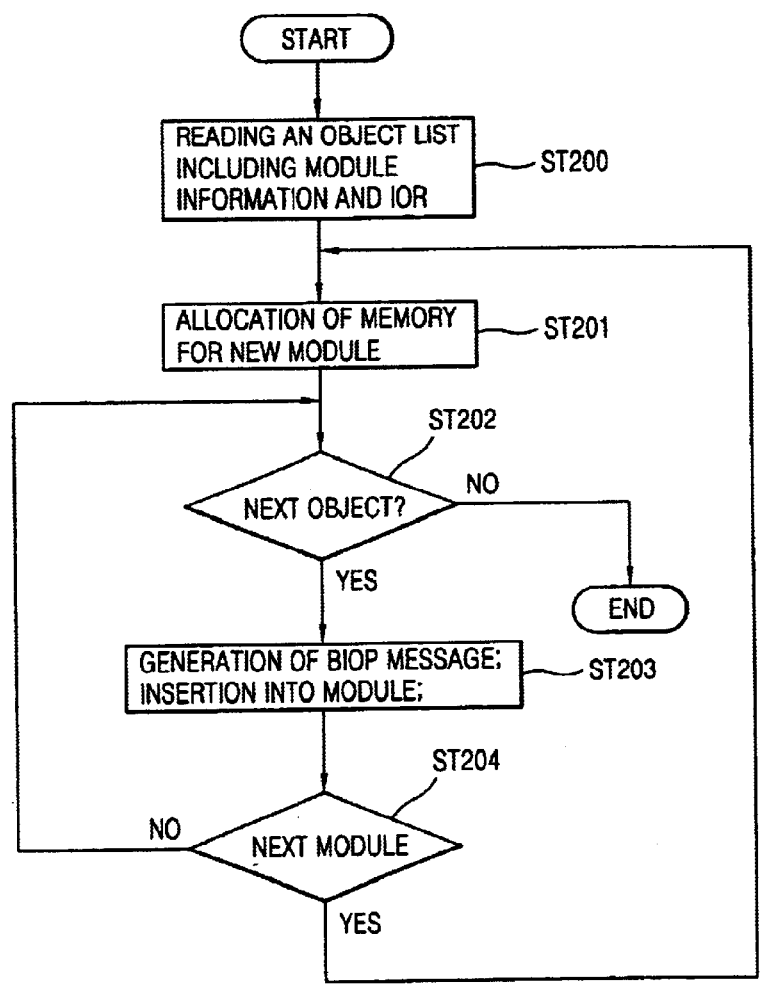

APPARATUS AND METHOD FOR GENERATING BROADCAST INTEROPERABLE PROTOCOL MESSAGE

BACKGROUND OF THE INVENTION

1. Field of the Invention

The present invention relates to an apparatus and method for generating a broadcast interoperable protocol (BIOP) message and in particular, to an apparatus and method for generating a broadcast interoperable protocol message in order to effectively generate a broadcast interoperable protocol message from a data/object carousel in a data server.

2. Description of the Background Art

Recently, as the standards for digital TV have been provided, broadcast protocols based on them are being implemented. A digital storage media-command control (DSM-CC) object carousel among the above protocols plays a role in repeatedly transmitting a series of objects from a broadcast server to a client. At this time, data or properties of the objects in the object carousel are transmitted in a message, and this message is referred to as a broadcast interoperable protocol (BIOP) message. The BIOP message includes a service gateway, a directory, a file and a stream message.

The objects (a service gateway, directory, file and stream message) in the object carousel are constructed as a tree structure, in which the location of each object is judged by its parent node, and the parent node stores information on the objects belonging to its directory.

FIG. 1 illustrates a tree structure of objects in an object carousel, wherein a service gateway has a directory object below itself, and the directory has a file, a stream, and other directory objects below itself.

In order to process the objects in the above tree structure and transmit them to a client, a protocol in accordance with the conventional art generates an object carousel as a BIOP message in the form of individually constituting a route from a parent node to a target object for each object. Therefore, the BIOP message not only increases the size of data to be transmitted from a server to a client, but also accordingly generates a broadcast interoperable protocol in a noneffective way.

Meanwhile, a definite protocol has not been defined yet in constituting a BIOP message which forms an object carousel from the objects in the above tree structure.

SUMMARY OF THE INVENTION

Accordingly, it is an object of the present invention to provide an apparatus for generating a broadcast interoperable protocol capable of effectively generating a broadcast interoperable protocol (BIOP) when a data broadcast server implements a data/object carousel.

It is another object of the present invention to provide a method for generating a broadcast interoperable protocol capable of effectively generating a broadcast interoperable protocol when a data broadcast server implements a data/object carousel.

In order to achieve the above objects, the apparatus for generating a broadcast interoperable protocol message in accordance with the present invention includes a data/object carousel manager for periodically outputting cyclic data and transmitting the same upon receipt of a broadcast signal in accordance with the present invention, a stream server for outputting audio/video data, and a remux unit for outputting remultiplexing data to a client upon receipt of the cyclic data and the audio/video data.

In order to achieve the above objects, in a broadcast interoperable protocol message for transmitting a series of objects in a broadcast server to a client, the method for generating a broadcast interoperable protocol message in accordance with the present invention includes the steps of classifying the series of objects as a module, obtaining an interoperable object reference (IOR) to the objects, and forming the objects in a single broadcast interoperable protocol message.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein:

FIGS. 2A through 2D are views illustrating a process of processing objects in accordance with the present invention;

FIG. 3 illustrates a general block diagram of a broadcast server using a data/object carousel manager in accordance with the present invention;

FIG. 4 is a detail block diagram of a data/object carousel manager in accordance with the present invention;

FIG. 5 is a flow chart illustrating a method for forming a module of a broadcast interoperable protocol message and generating an interoperable object reference (IOR) to each object in accordance with the present invention; and FIG. 6 is a flow chart illustrating a method for generating a BIOP message to an object and forming an actual module data in accordance with the present invention.

DETAILED DESCRIPTION OF THE PREFERRED EMBODIMENTS

Figure 1:
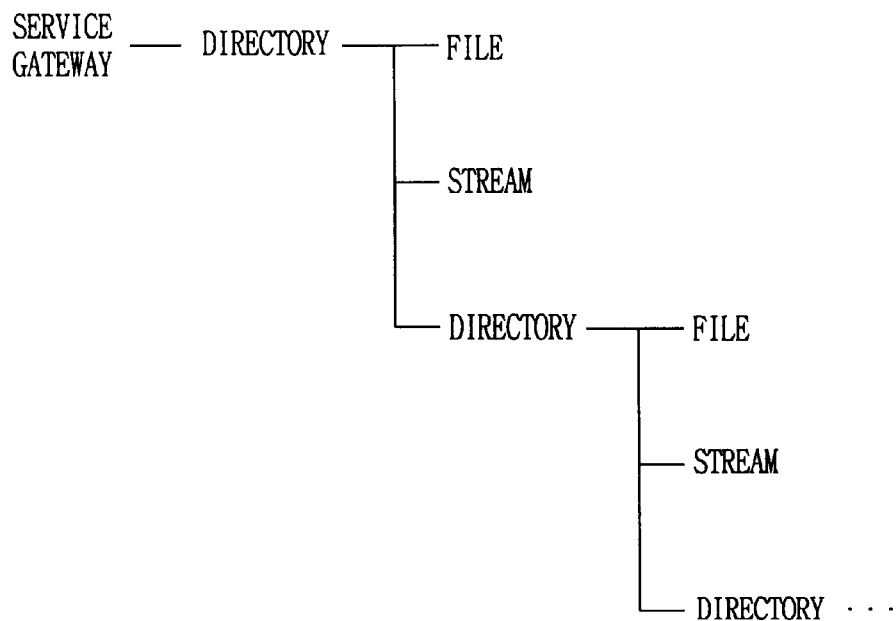
FIG. 1 is a tree structure of objects in an object carousel.

FIGS. 2A through 2D are views illustrating a process of processing objects in accordance with the present invention.

FIG. 2A is a view illustrating a format of broadcast interoperable protocol (BIOP) messages generated in an object carousel, wherein a BIOP message is formed of a message header, a message subheader and a message body. That is, a first BIOP includes a message header (H1), a message subheader (H2), a message body (directory object), a second BIOP includes a message header (H1), a message subheader (H2) and a message body (stream object), and a third BIOP includes a message header (H1), a message subheader (H2) and a message body (file object).

FIG. 2B illustrates modules generated in a download data carousel, wherein the modules are formed by logically gathering one or more BIOP messages. As illustrated therein, the above-mentioned three BIOP messages are formed of five modules.

FIG. 2C is a view illustrating blocks generated in a download data carousel, wherein five blocks are formed by including a header (H3) to each of the above-described modules.

FIG. 2D is a view illustrating digital storage media-command control (DSM-CC) sections for transmitting objects in a broadcast server to a client, wherein each section is formed by including a section header (H4) to each of the blocks in the download data carousel.

At this time, each object can be obtained from the outside through an interoperable object reference (IOR). That is, since the objects in the object carousel can find objects below themselves while travelling in the directory, the directory BIOP message has an IOR list of objects belonging to its tree. The IOR requires information on the module to which an object itself belongs. Thus, when modules are classified and then IORs are generated, BIOP messages to all objects are formed. In other words, two steps are required in order to form BIOP messages to all the objects in the object carousel. For this, an apparatus for generating a BIOP message will now be described with reference to the accompanying drawings.

FIG. 3 is a block diagram of a broadcast server using a data/object carousel manager in accordance with the present invention, which includes a data/object carousel manager 100 for periodically transmitting a cyclic data (CYC. DATA) upon receipt of a broadcast signal, a stream server 200 for outputting audio/video data (AN DATA), a remux unit 300 for outputting a remultiplexing data to a client upon receipt of the cyclic data (CYC. DATA) and audio/video data (A/V DATA).

Herein, the stream server 200 includes an audio unit 201 for outputting an audio data, a video unit 202 for outputting a video data, and a stream transmission unit 203 for outputting the received audio/video data (AN DATA) in a stream shape.

FIG. 4 is a detail block diagram of a data/object carousel manager as illustrated in FIG. 3, which includes a data message generating unit 110 for outputting blocks and control signals transmittable from objects in a tree structure, a control message generating unit 5 for generating a control message using module information outputted from the data message generating unit 110, a carousel manager 4 for managing the carousel according to the control message outputted from the control message generating unit 5 upon receipt of a certain control information outputted from the data message generating unit 110, a MPEG-2 section generating unit 6 for converting the blocks outputted from the data message generating unit 110 to a MPEG-2 section format and outputting the same according to the control message outputted from the control message generating unit 5, and a cyclic data transmission unit 7 for periodically transmitting the converted MPEG-2 sections outputted from the MPEG-2 section generating unit according to the control message outputted from the control message generating unit 5 as cyclic data (CYC. DATA).

Herein, the data message generating unit 110 includes an IOR generating unit 1 for generating an IOR to each object (service gateway, directory, file, stream message, etc.) upon receipt of objects in a tree structure, a BIOP message generating unit 2 for generating BIOP messages using the IOR generated by the IOR generating unit 1 and then generating modules, and a block generating unit 3 for dividing the modules generated by the BIOP message generating unit 2 into blocks of the same size.

The operation of the apparatus for generating a BIOP message in accordance with the present invention thusly described will now be described with reference to FIGS. 5 and 6.

FIG. 5 is a flow chart illustrating a method for generating modules to BIOP messages and an interoperable object reference (IOR) to each object in accordance with the present invention, wherein objects in a tree structure are inputted and a list thereof is created at ST 100, and then the current module size is initialized to 0 at ST 101.

Next, it is judged whether or not an object exists in a module to be checked at ST 102, and if there is an object in the module, a new module size is obtained by adding the size of the object to the above-mentioned module size, while generating an IOR to the object at ST 103. If the obtained module size is smaller than the maximum module size at ST 104, the routine returns to ST 102.

Meanwhile, if the obtained module size is bigger than the maximum module size, information on the obtained module is stored at ST 105 and the routine returns to the step ST 101 of initializing the current module size.

Therefore, by repeatedly performing the above steps, modules to the inputted objects in a tree structure and IOR to the objects are generated.

FIG. 6 is a flow chart illustrating a method for generating an BIOP message to an object and forming an actual module data in accordance with the present invention. Referring to FIG. 6, an object list including module information and an IOR is read at ST 200. A memory is allocated for a new module at ST 201. It is judged whether an object is included in the module or not at ST 202, and if there is an object in the module, a BIOP message is generated and the generated message is inserted into the module at ST 203.

Next, it is judged whether a next module exists or not at ST 204, and if there is a module, the routine returns to the step ST 201 of allocating a memory to a new module. If there is no module, the routine returns to the step ST 202 of judging whether a next object exists or not in the above module. If there is no object in the module, the process of generating a BIOP message and module data is finished.

Accordingly, by repeatedly performing the above steps, a BIOP message is generated from the module and IOR generated from the inputted objects in the tree structure, and actual module data is generated.

In the apparatus and method for generating a BIOP message in accordance with the present invention thus described, it is easy to generate a BIOP message to a large amount of object data, so that a large amount of data can be transmitted to a plurality of clients in real time with ease.

What is claimed is:

1. An apparatus for generating a broadcast interoperable protocol (BIOP) message, comprising:

a data/object carousel manager for periodically outputting cyclic data and transmitting the same upon receipt of a broadcast signal;

a stream server for outputting audio/video data; and a remux unit for outputting remultiplexing data to a client upon receipt of the cyclic data and the audio/video data;

wherein the data/object carousel manager includes a data message generating unit including:

an IOR (interoperable object reference) generating unit for creating a list of objects upon receipt of objects in a tree structure, initializing the size of a current module in the created list, judging whether or not an object exists in the module, obtaining a module of a new size by adding the object size to the size of the current module, and generating an IOR to the object, a BIOP message generating unit for reading the list of objects having module control information and an IOR, allocating a memory for storing the module, judging whether or not an object exists in the module, and generating a BIOP message, and a block generating unit for dividing the modules generated by the BIOP message generating unit into blocks of the same size.

2. The apparatus of claim 1, wherein the stream server comprises:
   an audio unit for outputting an audio data;
   a video unit for outputting a video data; and
   a stream transmission unit for receiving the audio and video data and outputting the same in a stream.

3. The apparatus of claim 1, wherein the data/object carousel manager further comprises:
   a control message generating unit for generating a control message using module information generated by the data message generating unit;
   a compressed data section generating unit for converting the blocks outputted from the data message generating unit to a compressed data section format and outputting the same according to the control message outputted from the control message generating unit; and
   a cyclic data transmission unit for periodically transmitting converted data sections outputted from the compressed data section generating unit according to the control message outputted from the control message generating unit as cyclic data.

4. The apparatus of claim 3, wherein the apparatus further comprises a carousel manager for managing a carousel according to the control message outputted from the control message generating unit upon receipt of control information outputted from the data message generating unit.

5. The apparatus of claim 1, wherein the object comprises a service gateway, a directory, a file and a stream message.

6. The apparatus of claim 3, wherein the compressed data is in the MPEG-2 format.

7. A method for generating a broadcast interoperable protocol (BIOP) message for transmitting a series of objects in a broadcast server to a client, comprising the steps of:
   classifying the series of objects as a module and obtaining an interoperable object reference (IOR) to the objects; and
   forming the plurality of objects in a single broadcast interoperable protocol message;
   wherein the step of making the module and obtaining the IOR to the objects includes the steps of:
      creating a list of the objects upon receipt of objects in a tree structure and initializing the size of the current module to 0 in the created list, and
      judging whether or not an object exists in the module, and if there is an object in the module, obtaining a module of a new size by adding the object size to the size of the current module and generating an IOR to the object.

8. The method of claim 7, wherein the step of making the module and obtaining the IOR to the objects further comprises the steps of:
   comparing the size of the newly obtained module with the maximum size of the module, and, if the size of the newly obtained module is smaller than the maximum size of the module, judging whether or not an object exists in the module; and
   comparing the size of the newly obtained module with the maximum size of the module, and, if the size of the newly obtained module is bigger than the maximum size of the module, storing the information on the newly obtained module and initializing the size of the current module.

9. The method of claim 7, wherein the step of forming the plurality of objects in a single broadcast interoperable protocol message comprises the steps of:
   reading an object list having module control information and an IOR and allocating a memory for storing the module;
   judging whether an object exist in the module or not, and, if there is an object in the module, generating a BIOP message and inserting the generated message into the module; and
   judging whether a next module exists, and, if there is a module, allocating a memory for a new module, or, if there is no module, judging whether a next object exists or not in the module.

10. In a broadcast interoperable protocol (BIOP) message for transmitting a series of objects in a broadcast server to a client, a method for generating a BIOP message, comprising the steps of:
   classifying the series of objects as a module and obtaining an interoperable object reference (IOR) to the objects; and
   forming the plurality of objects in a single broadcast interoperable protocol message,
   wherein the step of forming the plurality of objects in a single broadcast interoperable protocol message comprises the steps of:
      reading an object list having module control information and an IOR and allocating a memory for storing the module;
      judging whether an object exist in the module or not, and, if there is an object in the module, generating a BIOP message and inserting the generated message into the module; and
      judging whether a next module exists, and, if there is a module, allocating a memory for a new module, or, if there is no module, judging whether a next object exists or not in the module.

* * * * *